United States Patent [19]

Voss

[11] Patent Number: 4,631,722
[45] Date of Patent: Dec. 23, 1986

[54] ELECTRONIC CONTROLLER FOR CYCLICALLY OPERATING MACHINERY

[75] Inventor: Thomas Voss, Tettnang, Fed. Rep. of Germany

[73] Assignee: ZF-Herion-Systemtechnik GmbH, Friedrichshafe, Fed. Rep. of Germany

[21] Appl. No.: 562,580
[22] PCT Filed: Feb. 4, 1983
[86] PCT No.: PCT/EP83/00030
§ 371 Date: Oct. 11, 1983
§ 102(e) Date: Oct. 11, 1983
[87] PCT Pub. No.: WO83/02816
PCT Pub. Date: Aug. 18, 1983

[30] Foreign Application Priority Data

Feb. 11, 1982 [DE] Fed. Rep. of Germany ....... 3204709

[51] Int. Cl.[4] .................... G06F 11/00; G06F 7/34; G05B 15/08; G05B 9/02
[52] U.S. Cl. ........................... 371/9; 371/68; 364/133; 364/184
[58] Field of Search ............... 364/133, 184, 185, 186, 364/187, 200 MS File, 900 MS File; 371/23, 24, 71, 68, 8, 9, 10

[56] References Cited

U.S. PATENT DOCUMENTS

| | | | |
|---|---|---|---|
| 3,686,493 | 8/1972 | Schmid | 371/68 |
| 4,198,678 | 4/1980 | Maatje et al. | 364/426 |
| 4,200,226 | 4/1980 | Piras | 371/9 |
| 4,233,682 | 11/1980 | Liebergot et al. | 371/68 |
| 4,350,225 | 9/1982 | Sakata et al. | 371/9 |
| 4,358,823 | 11/1982 | McDonald et al. | 364/200 |
| 4,400,792 | 8/1983 | Strelow | 364/900 |

OTHER PUBLICATIONS

"Sicherheitstechnishe Anforderungen an eletronische Steuerungen", published in Mar. 1980, in *Arbeitssichercheit*.

*Primary Examiner*—Jerry Smith
*Assistant Examiner*—Jon D. Grossman
*Attorney, Agent, or Firm*—Karl F. Ross; Herbert Dubno

[57] ABSTRACT

An electronic controller with safety facilities for a device with mechanical motion sequences with two differently designed safety channels, of which the first safety channel is constructed with hard-wired switching logic and the second according to microcomputer technology, comprises a safety stage common to both safety channels which places the device in a safe state upon the appearance of unequal output signals appear in the safety channels. Such a controller is to be improved with respect to system safety and availability for utilization with cyclically operating devices. At the same time, the least possible structural complexity is to be achieved. To this end, the safety channels assume identical control functions simultaneously. Furthermore, each safety channel is equipped with self-check facilities whose signals, together with the comparison result of a comparison of the output signals of the two safety channels, act upon a safety stage which places the device in a safe state when malfunctions arise.

6 Claims, 6 Drawing Figures

ELECTRONIC CONTROLLER FOR CYCLICALLY OPERATING MACHINERY

CROSS REFERENCE TO RELATED APPLICATIONS

This application is a national phase application corresponding to PCT/EP83/00030 filed Feb. 4, 1983 and based, in turn, upon a German national application No. P 32 04 709.6 filed Feb. 11, 1982.

FIELD OF THE INVENTION

The invention relates to an electronic controller with safety facilities for a device with mechanical sequences with two differently designed safety channels, of which the first safety channel is constructed with hard-wired switching logic and the second according to microcomputer technology, and with a common safety stage which upon the occurrence of unequal output signals of the two safety channels places the device in a safe state, as well as with a self-check facility for the second safety channel.

BACKGROUND OF THE INVENTION

Especially high safety-technological demands must be made on controllers where control malfunctions can cause injury to persons. For the enhancement of the safety of electronically controlled production machines numerous possibilities are known (Dipl. Ing. W. Wienandts "Sicherheitstechnische Anforderungen und electronische Steuerungen" published in "Die BG", March 1980, pp. 220–224). FIG. 2 of the cited reference shows a press controller with two identically constructed control channels whose individual stages are monitored by a safety channel by means of comparison. The safety channel in turn contains a self-check feature. In a system of this type, system errors are possible, e.g. design errors, which are not recognized. It does thereby not offer the necessary safety.

FIG. 6 of the cited publication shows the systemic structure of an electronic controller for a moving staircase. It has one control channel and two safety channels, one of which is constructed with hard-wired switching logic and the other with microcomputer technology. Owing to different technologies utilized in processing the signals, the probability of systematic errors affecting the two control channels simultaneously and in the same manner is considerably reduced. Nevertheless, the probability of simultaneously occurring malfunctions in the first and second safety channels is unacceptably high, since on account of the great number of integrated components in the safety channels with microcomputer technology there exists a high probability of malfunction for this channel. Self-check facilities in this safety channel can reduce the effects of frequent errors. A self-check with a high rate of malfunction recognition, however, requires a time which, depending on circumstances, can last several seconds. This monitoring time may undesirably prolong the cycle time in devices operating cyclically and with periodic monitoring of this device and may thus decrease the availability and utilization of the device.

OBJECT OF THE INVENTION

The invention has the object of providing an electronic controller with safety facilities for cyclically operating devices, which affects the cycle time either not at all or only negligibly, and yields a high degree of safety.

SUMMARY OF THE INVENTION

This object is realized according to the invention by providing cyclically operating devices such that (a) the safety channels simultaneously have identical control functions and act upon respectively associated operating members, (b) the self-check facility effects the monitoring of the entire second safety channel by means of a monitoring program via a microcomputer and a control circuit, (c) the first safety channel also has its own self-check facility, (d) the self-checks occur periodically within the cycle periods, (e) amplifiers are connected to the outputs of the safety channels whose output signals are monitored by a comparator for equality and synchronism, (f) the output signal of the comparator and the output signals of the self-check facilities act upon a common safety stage.

Inasmuch as the safety channels simultaneously have identical safety functions and act upon respectively operating members, a redundant diversified system is realized with simple means and few components both in its control aspects and in its safety aspects so that the simultaneous appearance of errors in both channels is largely prevented. The self-check facility for monitoring the entire second safety channel by means of a monitoring program permits the modification of the monitoring program, to assure the shortest monitoring periods with a high degree of malfunction recognition. The monitoring program can be tailored to the elements of the safety channel relevant to safety.

Negative effects upon the safety of the device are to be expected only when, despite the dissimilar safety channels, a malfunction occurs in both safety channels simultaneously which is not recognized. By means of the additional self-check in the first safety channel, the probability of coincidence of two unrecognized errors in the two safety channels is further decreased. To this end, the output signal of the comparator and the output signals of the self-check facility act upon a common safety stage.

On account of the coaction of the self-check facility in the first and the second safety channel, the safety of the overall system may be sufficient if the monitoring program is so arranged that the degree of malfunction recognition is between 70% and 90%. The degree of malfunction recognition is understood as the probability with which an error is recognized.

To provide for the self-monitoring of the first safety channel:

(a) a test signal at the input of the first safety channel is compared with the signal at the output; or (b) the self-check of the first safety channel is effected in that the input or output potentials of its components are compared with reference potentials.

In accordance with a further development of the invention, it is proposed to provide contacts between the safety channels and the operating members which are actuated by a single relay controlled by the safety stage. The use of a single relay, which is desirable for simplification, is possible from the standpoint of safety because the relay is positively actuated and equipped with a test contact.

Complexity is likewise reduced if the operating members are combined into a press safety valve which contains two valve windings, each of which is controlled by a respective one of the safety channels. In accordance with a further development of the invention, the comparator is formed by a rectifier bridge circuit in whose rectified bridge branch the relay and in whose other bridge branch the operating members are disposed. This results in an efficient construction of the comparator which simultaneously monitors the connecting lines to the operating members and their electrical portion for short circuits and interruption.

In order to maximize the interference separation between the relay and the operating members it is advantageous to choose the ohmic resistance of the operating members significantly smaller than the ohmic resistance of the relay.

The electronic controller can also be used in a multiple arrangement. In an n-fold arrangement of the controller it will be useful to form a selector circuit m out of n, with m smaller than n.

BRIEF DESCRIPTION OF THE DRAWING

The invention is described with reference to drawings illustrating the subject matter of the invention. Therein

SPECIFIC DESCRIPTION

Figure 1:
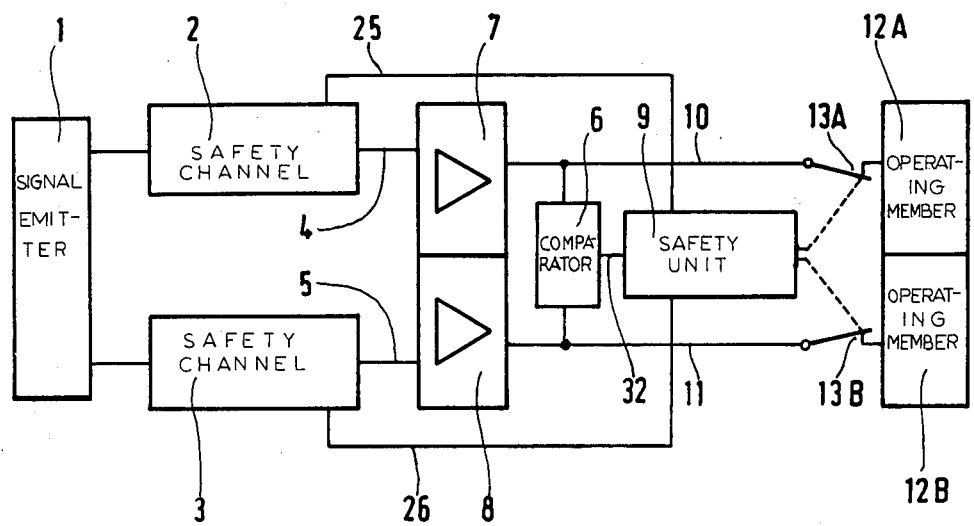
FIG. 1 shows a block diagram of an electronic controller according to the invention for a device with mechanical motion sequences with two safety channels of different design.

The electronic controller according to this invention (FIG. 1) is applicable to a cyclically operating device with mechanical motion sequences such as, for example, an eccentric press, a hydraulic press, an elevator control, machine tools, injection-molding machines, manipulators or similar devices. The device shall be monitored before each work cycle for safe and troublefree operation. The cycles may repeat periodically at constant intervals and with constant cycle length, or aperiodically with different intervals or with varying duration.

Connected to a signal emitter 1, comprising e.g. manual switches, time switches or sensors, are a first safety channel 2 with hard-wired switching logic and a second safety channel 3 in microcomputer technology which have parallel identical control functions and so form a redundant control system. The outputs of the safety channels 2 and 3 are connected via lines 4 and 5 and amplifiers 7 and 8, respectively, to a comparator 6 in which the output signals are monitored for uniformity and synchronism. The outputs of the amplifiers 7 and 8 are further connected, via respective lines 10 and 11 and contacts 13A and 13B pertaining to a relay 13, to operating members 12A and 12B, respectively, which, for example, may be press safety valves in the case of an accentric press or contactors for the operation of an elevator motor in case of an elevator.

Relay 13 is a component of a safety stage 9 which is acted upon by the amplified output signals of the safety channels 2 and 3 as well as the output signal of the comparator 6.

Figure 2:
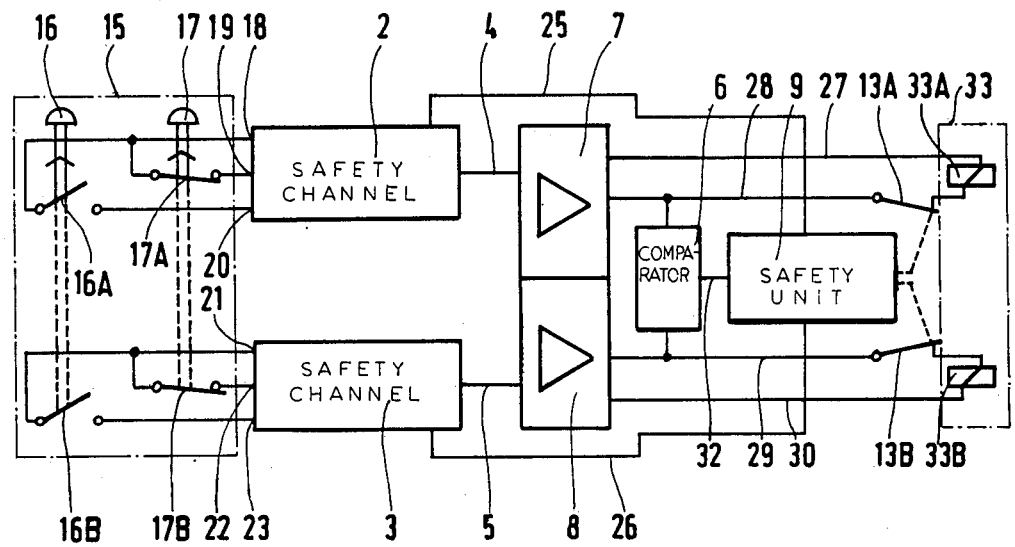
FIG. 2 shows an embodiment of the controller according to FIG. 1 in a basic representation for an eccentric press with manual-feed operation and a two-hand panel to perform a one-stroke control.

The embodiment shown in FIG. 2 relates to an electronic controller for an eccentric press with manual-feed operation, the press stroke being initiated via a two-hand panel 15. The latter comprises keys 16, 17 whose contacts 16A, 17A are connected to the first safety channel 2 via terminals 18, 19, 20 and whose contacts 16B, 17B are connected to the second safety channel 3 via terminals 21, 22, 23. The controller is so arranged that both keys 16, 17 must be depressed within a predetermined time interval, e.g. of at most 0.5 sec., in order to cause at the output an actuation of the press safety valve 33. If the above-mentioned time interval is exceeded, the output does not react.

The press safety valve 33 consists of a solenoid valve with two valve windings 33A and 33B which are connected via lines 27, 28 and 29, 30, respectively, to the amplifiers 7 and 8, respectively. Line 28 includes a contact 13A and line 29 includes a contact 13B. Contacts 13A, 13B are initially closed and are opened only upon the recurrence of a malfunction, simultaneously, by safety stage 9.

Figure 3:
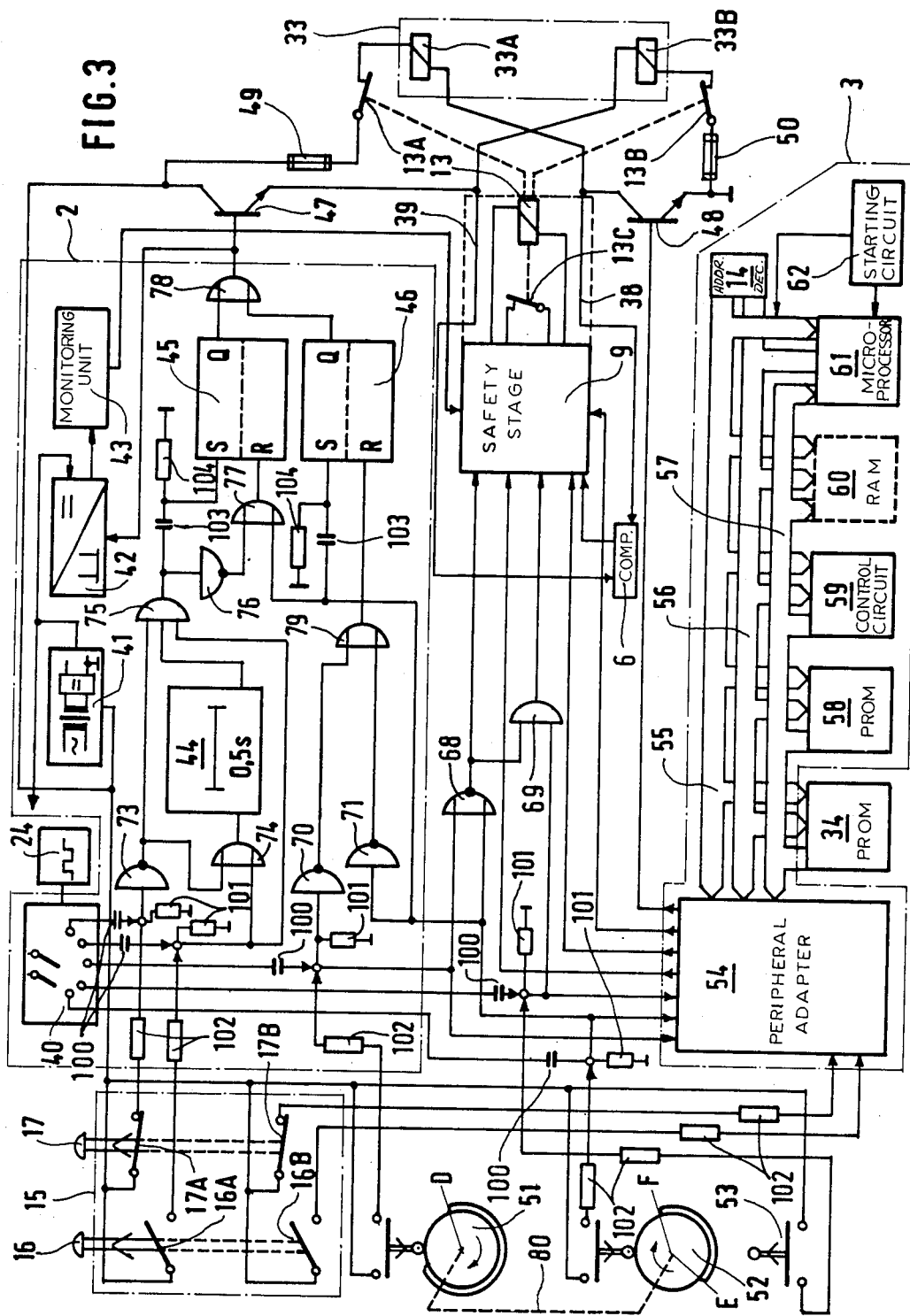
FIG. 3 shows an embodiment according to FIG. 2 with detailed structure of the safety and control channels, and with cam switches for OT disconnection or the self-maintenance of a cut-in contact.

The first safety channel (FIG. 3) comprises essentially a control unit 40 and an associated oscillator 24 which serves to advance the control unit 40 and generates a test signal at the input of the first safety channel, furthermore a network coupler 41 and a converter 42 which from the test signal at the output of the first safety channel 2 and the supply voltage from network coupler 1 [sic] generates a control potential, proportional to the monitoring frequency as well as to the supply voltage, to a monitoring unit 43. The same triggers the safety stage 9 upon falling below a threshold value. A monoflop 44, i.e. a monostable multivibrator, with a switching time of 0.5 sec. assures that an actuation of the keys 16, 17 affects the output only when occurring within the switching time. Two flip-flops 45, 46 act via an OR gate 78 upon a transistor 47 which serves as amplifier 6. The components referred to are logically connected to the control inputs via AND gates, OR gates or inverters.

In addition to keys 16 and 17, two cam switches 51, 52 (FIG. 3), whose cams rotate with a shaft 80 having its rotation derived from the stroke of the press, also pertain to the control inputs. They serve for disconnection in the upper dead center of the eccentric press. In addition, the cam switch 52 holds the press in its ON state from position E on, regardless of the position of the keys 16 or 17. There further pertains to the control inputs a torque switch 53 for the brake monitoring, which generates a confirmation signal only when the main and ancillary brakes of the press actually provide the necessary braking torque.

The contacts of the keys 16, 17 of the cam switches 51, 52 and the torque switch 53 are connected via protective resistors 102 with the inputs of the first safety channel 2 and of the peripheral adapter 54 of the second safety channel 3. Contact 17A acts, via an inverter 73, upon an AND gate 75 as well as an OR gate 74 while contact 16A acts upon OR gate 74 and AND gate 75. The OR gate 74 acts by way of monoflops 44 also upon the AND gate 75. A signal will be present at the output of AND gate 75 only when keys 16 and 17 are actuated and their actuation took place within a time span of 0.5 sec. The output signal of the AND gate 75 generates a setting command in flip-flop 45 via a differentiator consisting of a capacitor 103 and a resistor 104. In case there is no output signal at the OR gate 75, a resetting command goes to flip-flop 45 via an inverter 76 and an OR gate 77.

The cam switch 51 acts upon the resetting input of flip-flop 46 via an inverter 70 and an OR gate 79 so that flip-flop 46 is in the reset position when cam switch 51 is open. The cam switch 52 acts via OR gate 77 upon the resetting input of flip-flop 45, via a differentiator consisting of a capacitor 103 and a resistor 104 upon the setting input of flip-flop 46, and via an inverter 71 and the OR gate 79 upon the resetting input of flip-flop 46. Thus, flip-flop 46 receives a resetting command when cam switch 51 is open whereas flip-flop 45 receives a resetting command when cam switch 52 is open. When cam switch 52 is closed, flip-flop 45 receives a resetting command while flip-flop 46 receives a setting command via differentiator 103, 104. Flip-flops 45 and 46 are connected to converter 42 and transistor 47 via OR gate 78.

The cam switch 52 further acts via a NOR element 68 and an AND gate 69 upon safety stage 9. The second input of AND gate 69 is connected to the torque switch 53. Thus, safety stage 9 responds when cam switch 52 is open and torque switch 53 closes at the same time.

The second safety channel 3 comprises essentially a peripheral adapter 54, program memories (PROM) 34, 58, a control circuit 59, a microprocessor 61 and a working memory (RAM) 60, all of which are interconnected by control lines 55, an address bus 56 and a data bus 57. In addition, a starting circuit 62 and an address decoder 14 belong thereto. The inputs to the peripheral adapter 54 are connected to the contacts of keys 16, 17 of the cam switches 51, 52, and of the torque switch 53 while the outputs act directly upon safety stage 9 or via transistor 48 which serves as amplifier 8. A comparator G, placed between the outputs of safety channel 2 and safety channel 3, tests the signals for uniformity and synchronism and transmits the result to safety stage 9.

The transistors 47 and 48 switch the circuit for the windings 33A and 33B of the press safety valve 33 which is led via contacts 13A and 13B of relay 13. These contacts open when the relay 13 drops out because of a malfunction signal from safety stage 9. Such a malfunction signal may be the result of signal comparison of comparator 6 or of signals of the monitoring facilities of the two safety channels.

The self-check of the first safety channel 2 takes place during the cyclic pauses between individual strokes. For this purpose, the oscillator furnishes via differential units 100, 101 narrow spikes of predetermined frequency via a control unit 40 to the first safety channel 2. If safety channel 2 is operational, it transmits a predetermined pulse frequency to converter 42. By using narrow spikes, and suitable circuitry design, one insures that the test frequency does not trigger any control function. With absent or deviating frequency, on the other hand, the safety stage responds and prevents further operation of the press.

The monitoring of the second safety channel 3 is carried out by means of a safety program which is contained in a program memory 34 or 58. Microprocessor 61 either is in the safety cycle or carries out additional tasks, not relevant to safety, after which it returns immediately into the safety cycle. The monitoring program is active at such time. The sum of the values resulting from the programs of the respective program memories 34 and 58 and of additional characteristic values is continuously computed and compared to a nominal reference value which may be generated e.g. by galvanic bridges. If the result is faulty or absent, safety stage 9 is triggered.

When the controller emits a signal to the peripheral adapter 54, the computer is immediately made available to the microprocessor 61 for control purposes by means of an interrupt command. It processes the control commands according to its control program until the end of the stroke is signaled by the cam switch 51 and the torque switch 53 and the monitoring program is reactivated. If the computer does not return to the safety cycle, safety stage 9 is also triggered and the device falls back into the safe state.

Faults may arise in the valve windings 33A, 33B which cannot be evaluated easily or with certainty. This is for example the case where the valve windings are short-circuited, since they already are very low-ohmic. In case of such a malfunction, fuses 49, 50 provided in the energizing circuits will open when energization occurs. Thereafter, safety stage 9 is triggered which correlates the various fault indications and, when activated, causes relay 13 to open.

The safety-relevant portion of safety stage 9 is designed in fail-safe technology. Relay 13 has positively actuated contacts so that it can be securely monitored. Safety stage 9 and relay 13 are monitored cyclically in that after every stroke shutoff a functional test is initiated which also entails a cutoff of the relay. In this test, an automatic reconnection can only occur when the safety stage 9 has not been disturbed, the torque switch 53 indicates sufficient braking tongue, there are no error indications from safety channels 2, 3 or amplifiers 7, 8, and relay 13, via a contact 13C which acts as a test contact, has verified a definite release of relay 13. After a disconnection due to malfunction, an automatic reconnection will be prevented even when the malfunction has ceased to exist.

Figure 4:
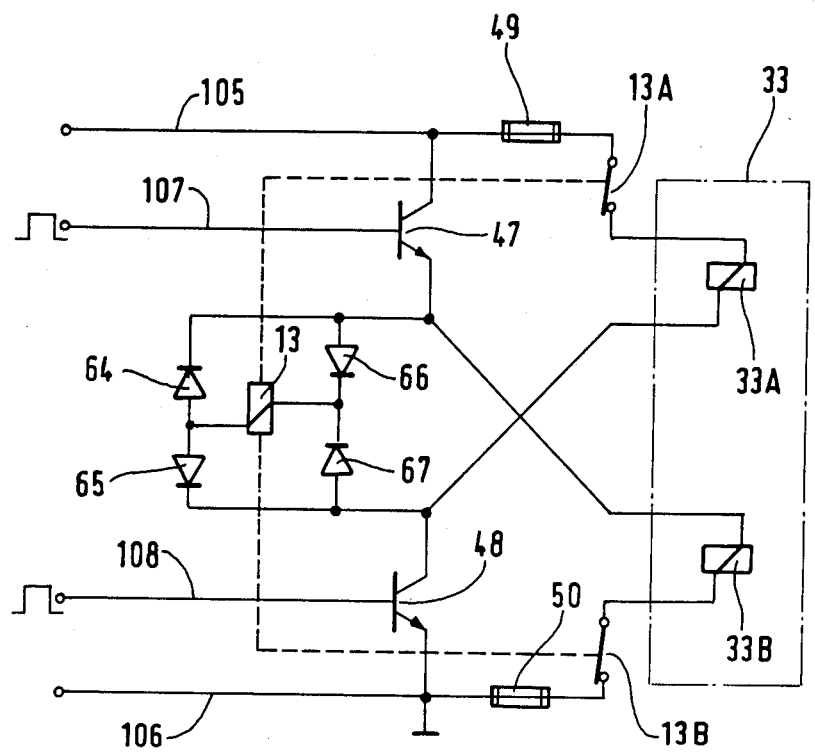
FIG. 4 shows a current flow of an embodiment of a comparator for the output signals of the safety channels.

An embodiment of an output-stage monitor, that is a surveyance of transistors 47, 48 (FIG. 4), comprises besides the press safety valve 33 a bridge circuit consisting of diodes 64, 65, 66, 67 and that winding of relay 13 which lies in the rectified branch of the bridge circuit. Contacts 13A and 13B belonging to the latter are placed between one terminal of one valve winding 33A and the collector of transistor 47, on the one hand, and between one terminal of valve winding 33B in press safety valve 33 and the emitter of transistor 48 on the other hand.

Power is supplied via terminals 105 and 106, terminal 106 being at zero potential. In the quiescent state, current flows via contact 13A, winding 33A, diode 67, relay 13, diode 64, winding 33B and contact 13B. Since relay 13 and windings 33A, 33B are arranged in series, they can be so correlated that only relay 13 will respond. Relay 13 and windings 33A, 33B are in parallel when transistors 47, 48 are energized via lines 107, 108 so that the voltage drop in windings 33A, 33B is sufficient to actuate the press safety valve 33. In case of defects in transistors 47, 48, or a short circuit or interruption in windings 33A, 33B or their associated conductors, relay 13 will drop out and contacts 13A, 13B will open. Thereby these components are also included in the monitor.

Figure 5:
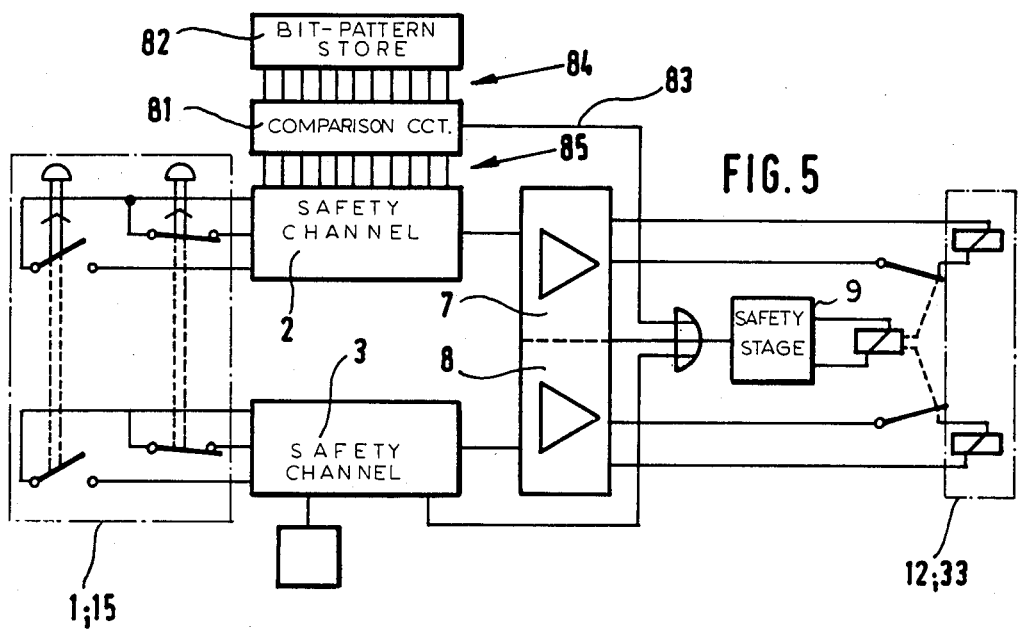
FIG. 5 shows a current flow, modified relatively to FIG. 2, of a different principle of the self-check of the first safety channel.

Another embodiment for monitoring the first safety channel 2 (FIG. 5) comprises a comparison circuit 81 which is connected to all gate inputs and outputs (FIG. 6) via lines 85, some gate inputs being possibly identical with other gate outputs. The electrical values in the gate inputs and outputs are compared via lines 84 (FIG. 5) to a bit pattern in a bit-pattern unit 82. The bit pattern corresponds to the quiescent state of the gate inputs and outputs. This makes it possible to recognize all malfunctions which are measurable on any gate in safety channel 2. Comparison circuit 81 has an output connected to a line 83. The potential appearing at the output varies cyclically; upon utilization with a press, for instance, an electrical voltage of +5 V would appear at the output during one stroke phase whereas it would be 0V during performance of the stroke. Line 83 extends to safety stage 9 which monitors the cyclic variations of the potential at the output of comparator 6.

Figure 6:
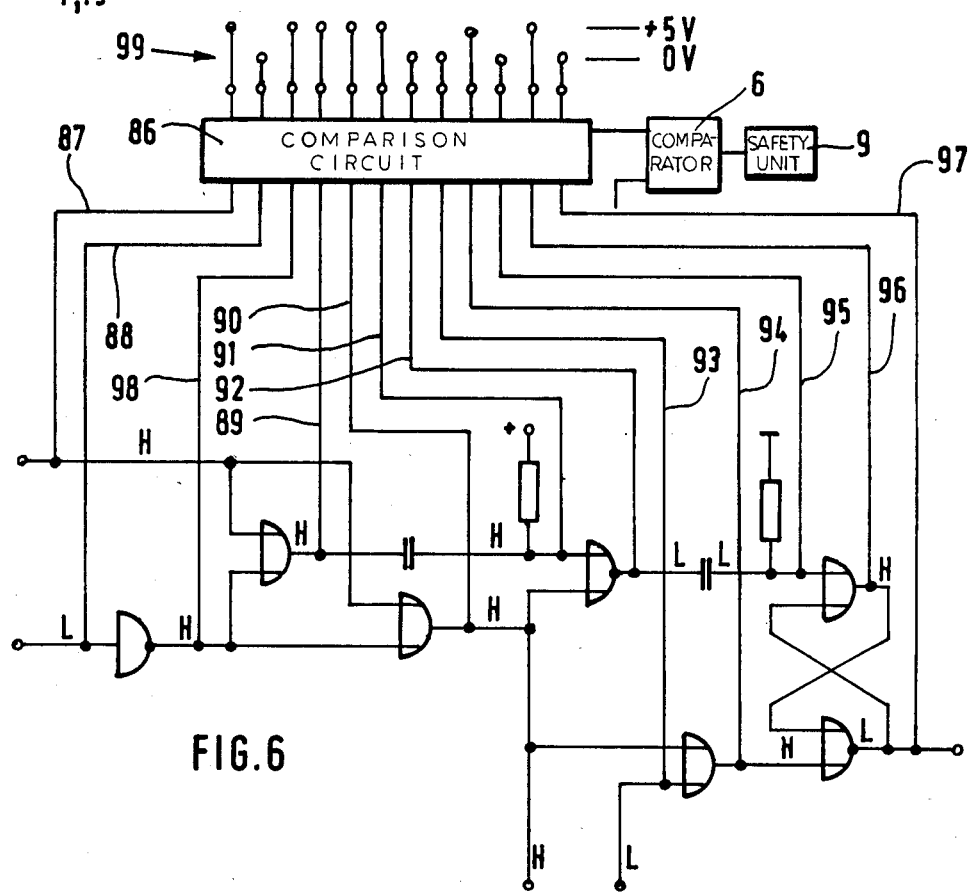
FIG. 6 shows a current flow of a circuit for self-check of the first safety channel according to the principle explained with reference to FIG. 5.

The lines 85 (FIG. 5) are individually designed as lines 87 to 98 in FIG. 6. From this circuitry it is apparent at which locations a potential H (high potential) and simultaneously potential L (low potential) will occur, or vice versa. The potential designations seen in FIG. 6 relate to the quiescent state of the circuitry corresponding e.g. to a stroke pause of the press.

The bit-pattern unit 82 (FIG. 5) is formed by galvanic bridges 99, e.g. soldered bridges or conductor strips.

| Reference characters | | | |
|---|---|---|---|
| 1 | signal emitter | 52 | cam switch |
| 2 | first safety channel | 53 | torque switch |
| 3 | second safety channel | 54 | peripheral adapter |
| 4 | line | 55 | control line |
| 5 | line | 56 | address bus |
| 6 | comparator | 57 | data bus |
| 7 | amplifier | 58 | program memory (PROM) |
| 8 | amplifier | | |
| 9 | safety stage | 59 | control circuit |
| 10 | line | 60 | working memory (RAM) |
| 11 | line | | |
| 12A | operating member | 61 | microprocessor |
| 12B | operating member | 62 | starting circuit |
| 13 | relay | 64 | diode |
| 13A | contact | 65 | diode |
| 13B | contact | 66 | diode |
| 13C | contact | 67 | diode |
| 14 | address decoder | 68 | NOR gate |
| 15 | two-hand panel | 69 | AND gate |
| 16 | key | 70 | inverter |
| 16A | contact | 71 | inverter |
| 16B | contact | 73 | inverter |
| 17 | key | 74 | OR gate |
| 17A | contact | 75 | AND gate |
| 17B | contact | 76 | inverter |
| 18 | terminal | 77 | OR gate |
| 19 | terminal | 78 | OR gate |
| 20 | terminal | 79 | OR gate |
| 21 | terminal | 80 | shaft |
| 22 | terminal | 81 | comparison circuit |
| 23 | terminal | 82 | bit-pattern unit |
| 24 | oscillator | 83 | line |
| 25 | line | 84 | line |
| 26 | line | 85 | line |
| 27 | line | 86 | comparison circuit |
| 28 | line | 87 | test line |
| 29 | line | 88 | test line |
| 30 | line | 89 | test line |
| 32 | line | 90 | test line |
| 33 | press safety valve | 91 | test line |
| 33A | valve winding | 92 | test line |

-continued

| Reference characters | | | |
|---|---|---|---|
| 33B | valve winding | 93 | test line |
| 34 | program memory (PROM) | 94 | test line |
| | | 95 | test line |
| 38 | line | 96 | test line |
| 39 | line | 97 | test line |
| 40 | control unit | 98 | test line |
| 41 | network coupler | 99 | bridge |
| 42 | converter | 100 | capacitor |
| 43 | monitoring unit | 101 | resistor |
| 44 | monoflops | 102 | protective resistor |
| 45 | flip-flop | 103 | capacitor |
| 46 | flip-flop | 104 | resistor |
| 47 | transistor | 105 | terminals |
| 48 | transistor | 106 | terminals |
| 49 | fuse | 107 | lines |
| 50 | fuse | 108 | lines |
| 51 | cam switch | | |

What is claimed is:

1. An electronic controller for a cyclically operating mechanical device comprising:
   two safety channels of different circuit construction, simultaneously having identical control functions and acting upon respectively associated operating members, of which a first of said safety channels is constructed with hard-wired switching logic and a second of such safety channels with microcomputer circuitry, including at least a microprocessor having a control program and a check program, said check program effecting a self-check of all components of said second safety channel, said channels having respective output signals;
   a common safety stage connected to both channels, which upon the occurrence of unequal output signals of the two safety channels places the device in a safe state;
   a self-check facility, different from said self-check of said second channel for effecting self-check of the first safety channel, the self-checks of said channels being effected periodically within the cycle periods; and
   amplifiers connected to the outputs of the safety channels and having output signals applied to a comparator for monitoring equality and synchronism of said two safety channels, said comparator having an output signal, the output signal of the comparator and output signals of the self-check facilities acting upon said common safety stage.

2. The electronic controller according to claim 1 comprising a surveillance program having a rate of error-detection from 70% to 90%.

3. The electronic controller according to claim 2, further comprising means comparing a test signal at the input of the first safety channel with the signal at the output of the channel.

4. The electronic controller according to claim 2, further comprising means for comparing potentials of components of the first safety channel with reference potentials to form the self-check of said first channel.

5. The electronic controller according to claim 1, further comprising means comparing a test signal at the input of the first safety channel with the signal at the output of this channel.

6. The electronic controller according to claim 1, further comprising means for comparing potentials of components of the first safety channel with reference potentials to form the self-check of said first channel.

* * * * *